United States Patent
Kao et al.

(10) Patent No.: US 6,775,612 B1
(45) Date of Patent: Aug. 10, 2004

(54) NAVIGATION PDA AND METHOD WITH OPTIMAL ANTENNA PLACEMENT

(75) Inventors: Min H. Kao, Leawood, KS (US); Michael Childs, Overland Park, KS (US); Darin J. Beesley, Overland Park, KS (US)

(73) Assignee: Garmin Ltd. (KY)

( * ) Notice: Subject to any disclaimer, the term of this patent is extended or adjusted under 35 U.S.C. 154(b) by 0 days.

(21) Appl. No.: 10/410,428

(22) Filed: Apr. 9, 2003

Related U.S. Application Data (63) Continuation of application No. 10/027,159, filed on Dec. 20, 2001, now Pat. No. 6,581,003.

(51) Int. Cl.[7] .............................................. G01C 21/00
(52) U.S. Cl. ...................................... 701/209; 701/213
(58) Field of Search .................................. 701/200, 208, 701/209, 211, 213, 214; 342/357.01, 357.06, 357.12, 357.13

(56) References Cited

U.S. PATENT DOCUMENTS 6,128,515 A  *  10/2000  Kabler et al. ............... 455/566

* cited by examiner

*Primary Examiner*—Yonel Beaulieu
(74) *Attorney, Agent, or Firm*—Devon A. Rolf (57) ABSTRACT

A GPS enabled personal digital assistant (PDA) is provided. A housing of the PDA includes a processor and a memory operably coupled to the processor. The memory has provided thereto cartographic data including any number of locations and data indicative of thoroughfares of a plurality of types connecting certain ones of the locations. A display is operably coupled to the processor, the display viewable at a front face of the housing. And, a GPS patch antenna is operably coupled to the processor and is located above the display within the housing to receive GPS signals.

36 Claims, 9 Drawing Sheets

| LEVEL | NUMBER OF JUMP SEGMENTS, NUMBER OF NODES EXPLORED FROM A GIVEN JUMP SEGMENT NODE | | | (4) | MAXIMUM MEMORY USE PERCENTAGE | (6) |
|---|---|---|---|---|---|---|
| 0 | 1,25 | 2,15 | 6,0 | 3 | 35 | 3 |
| 1 | 1,40 | 2,25 | 6,0 | 25 | 60 | 10 |
| 2 | 1,50 | 4,30 | 16,0 | 100 | 80 | 25 |
| 3 | 1,50 | 4,30 | 16,0 | 400 | 85 | 55 |
| 4 | 1,50 | 4,30 | 16,0 | 800 | 90 | 85 |
| | A,B (1) | A,B (2) | A,B (3) | MINIMUM DISTANCE IN KILOMETERS (5) | | MINIMUM MEMORY USE PERCENTAGE |

NAVIGATION PDA AND METHOD WITH OPTIMAL ANTENNA PLACEMENT

CROSS-REFERENCE TO RELATED APPLICATIONS

This application is a Continuation of U.S. application Ser. No. 10/027,159, filed Dec. 20, 2001, now U.S. Pat. No. 6,581,003. The specification of which is incorporated herein by reference.

FIELD OF THE INVENTION

The present invention relates generally to navigational devices, and in particular to a navigational device with improved processing management.

BACKGROUND OF THE INVENTION

Route planning devices are well known in the field of navigational instruments. The method of route planning implemented by known prior art systems depends on the capabilities of system resources, such as processor speed and the amount and speed of memory. As increased system capability also increases system cost, the method of route planning implemented by a navigation device is a function of overall system cost.

One feature of increased system capability cost relates to route calculating algorithms. By their nature, route calculation algorithms are greedy algorithms that tend to be somewhat exponentially behaved in the sense that the bigger that a route network gets, the bigger the solutions base gets for finding a convergence between one location and another location. As used herein, the term convergence implies an attempt to connect a path, or a route between the two location points. The term solution is intended to imply a completed convergence. In other words, a solution, as used herein, implies a complete continuous path connecting the two location points. As one of ordinary skill in the art will understand upon reading this disclosure, there may be only one or many in-numerable solutions between two points. Alternatively stated, there can be few or many ways to find a convergence between the two locations.

From this description one can appreciate that as an algorithm executes in a convergence sequence, attempting to find a solution or path between two different locations within cartographic data, memory space is required to store the explored routes between those two locations. As the path network being processed becomes larger, the memory space required to store the explored routes between two locations likewise becomes larger. And additionally, the potential solutions base becomes larger.

In order to process route calculation algorithms with a suitable speed or efficiency, the processor executing the algorithm will require quick access to the memory space. Dynamic random access memory, or dynamic (RAM) as it is commonly referred to, is one form of quickly accessible memory which is frequently used in conjunction with a processor to execute algorithms. All routing algorithms need to have a suitable memory to keep track of status information of the locations explored, i.e. that it has visited in the network, as the route calculation algorithm executes. Again, as the path network being processed becomes larger, the necessary memory increases. Unfortunately, unlimited memory, RAM or otherwise, is not always available or suitable for a particular application, e.g. the particular device implementation. Thus, the ability of a route planning device to obtain solutions between two points using a route calculation algorithm is a function of available memory. And, the amount of memory that is required naturally has an impact on product cost.

One approach to route calculation algorithms is to arrange a route network in a sort of hierarchy so that the processor/memory system can operate on the primary thoroughfares in favor of more minor ones. Conventionally, a navigable network is comprised of roads, ferry routes, and possibly other means to travel from one location in the network to another. The navigable network is described as a collection of intersections (known as nodes) of navigable features and links, arcs or paths (road, ferry, etc.) connecting nodes. Thus, the navigable network is viewed as a collection of nodes where a travel direction decision might need to be made, and a collection of links or arcs connecting the nodes and describing a travel path from one node to another. The term adjacency is conventionally used to describe the travel path and nodes reachable in the network from a given node. A solution between two points in the network involves iteratively examining the adjacencies from the start and destinations in the network, eventually 'discovering' a low-cost path.

One limiting factor for the route calculation algorithm is the size of the navigable network. As an example, a connected network of all the roadways in the United States contains a very large number of nodes and possible pathways, more than any practical system can evaluate. The lowest layer (level 0) would typically contain all navigable features, from small residential roadways through major interstates. Level 1 might be defined to omit residential level roads, but include collector or arterial level roads up through major interstates. Additional levels are typically defined, with only the most major thoroughfares through a region (such as interstate highways) defined at the highest routing level. Each level is conventionally defined to result in a fully connected network. The number of navigable features at level 0 is very large, as is the solution space for a routing algorithm operating only at level 0. Upper level networks contain far fewer navigable features, allowing the solution space to decrease dramatically.

Many conventional routing algorithms take advantage of this layering by first searching at the lowest defined layer (conventionally layer 0), and then switching to upper level layers as a function of implementation-specific switching criteria. As the algorithm progresses it conventionally seeks to switch from lower to higher layers, eventually searching only in the highest defined layer, which affords route traversal across large distances within a comparatively small solution space. Of course, a suitable solution may be found prior to reaching the highest routing level. It is through this approach that a system with limited search resources is able to obtain a good, though not necessarily optimal, solution from a very large solution space. Algorithms of this sort are conventionally bidirectional, searching simultaneously from the start and target locations in the routing network.

Almost all practically implemented routing algorithms use this hierarchical approach in order to afford an obtainable solution for any processor/memory system that has a limited amount of memory and a limited amount of computing power.

Many contemporary systems use a minimum of one to two megabytes (MB) of dynamic memory storage capacity to obtain solutions between two points of cartographic data using conventional route calculation algorithms. Comparatively speaking, 2 megabytes of memory is a lot of memory and is a luxury which is not always realizable in compact, low power device implementations such as handheld or portable devices. Even with 2 megabytes of RAM no routing algorithm can even begin to explore every path in a large thoroughfare network; that would require Gigabytes of memory. Additionally, exhaustively exploring every adjacency at every hierarchal level, even with unlimited memory, is not an effective use of a system's resources.

Indeed, some conventional processor/memory systems attempt to obtain solutions in a minimized memory storage space, e.g. using around 512 Kilobytes of RAM. However, such conventional systems frequently do not result in very good solutions. That is, those conventional systems may provide a solution between the two points. But, the solution will not include a best or even reasonably best path between the two locations when weighing all of the relevant criteria, e.g. shortest path, fastest path, path classification and so forth, due to their conventional algorithm approaches.

In summary, current prior art systems have created a spectrum of products in which the degree of navigational accuracy is dictated primarily by the cost of the system. The lower cost systems currently offer a low degree of accuracy that is often inadequate for users. Therefore, there exists a need for a navigational route planning device which is more efficient and accurate than current low cost systems, without requiring more expensive system resources. In addition, there is also a need for a navigational route planning device which provides more efficient use of memory and other resources in connection with a route calculation algorithm and which quickly obtains a best or reasonable best path between two locations.

SUMMARY OF THE INVENTION

The above mentioned problems of navigational devices are addressed by the present invention and will be understood by reading and studying the following specification. Systems and methods are provided for a navigational route planning device which is more efficient and accurate than current low cost systems, without requiring the more expensive system resources. The systems and methods of the present invention offer an improved navigational route planning device which provides a more efficient use of RAM and other resources in connection with a route calculation algorithm which quickly obtains a best or reasonable best path between two locations.

In one embodiment of the present invention, an electronic navigational aid device with forced layer switching based on memory constraints is provided. The navigational aid device includes a processor and a memory adapted to communicate with the processor. The memory has cartographic data including any number of locations and data indicative of thoroughfares of a plurality of types connecting certain ones of the locations. The plurality of thoroughfares are organized in a hierarchy of detail levels. The processor operates on a route calculation algorithm to find a path between any two of the number of locations and the route calculation algorithm dynamically forces switching between different levels in the hierarchy of detail levels based on a set of criteria.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

DETAILED DESCRIPTION OF THE INVENTION

In the following detailed description of the invention, reference is made to the accompanying drawings which form a part hereof, and in which is shown, by way of illustration, specific embodiments in which the invention may be practiced. The embodiments are intended to describe aspects of the invention in sufficient detail to enable those skilled in the art to practice the invention. Other embodiments may be utilized and changes may be made without departing from the scope of the present invention. The following detailed description is, therefore, not to be taken in a limiting sense, and the scope of the present invention is defined only by the appended claims, along with the full scope of equivalents to which such claims are entitled.

The present invention is drawn to navigational systems and devices having forced layer switching, route calculation capabilities. One type of navigational system includes Global Positioning Systems (GPS). Such systems are known and have a variety of uses. In general, GPS is a satellite-based radio navigation system capable of determining continuous position, velocity, time, and in some instances direction information for an unlimited number of users. Formally known as NAVSTAR, the GPS incorporates a plurality of satellites which orbit the earth in extremely precise orbits. Based on these precise orbits, GPS satellites can relay their location to any number of receiving units.

The GPS system is implemented when a device specially equipped to receive GPS data begins scanning radio frequencies for GPS satellite signals. Upon receiving a radio signal from a GPS satellite, the device can determine the precise location of that satellite via one of different conventional methods. The device will continue scanning for signals until it has acquired at least three different satellite signals. Implementing geometric triangulation, the receiver utilizes the three known positions to determine its own two-dimensional position relative to the satellites. Additionally, acquiring a fourth satellite signal will allow the receiving device to calculate its three-dimensional position by the same geometrical calculation. The positioning and velocity data can be updated in real time on a continuous basis by an unlimited number of users.

Figure 1:
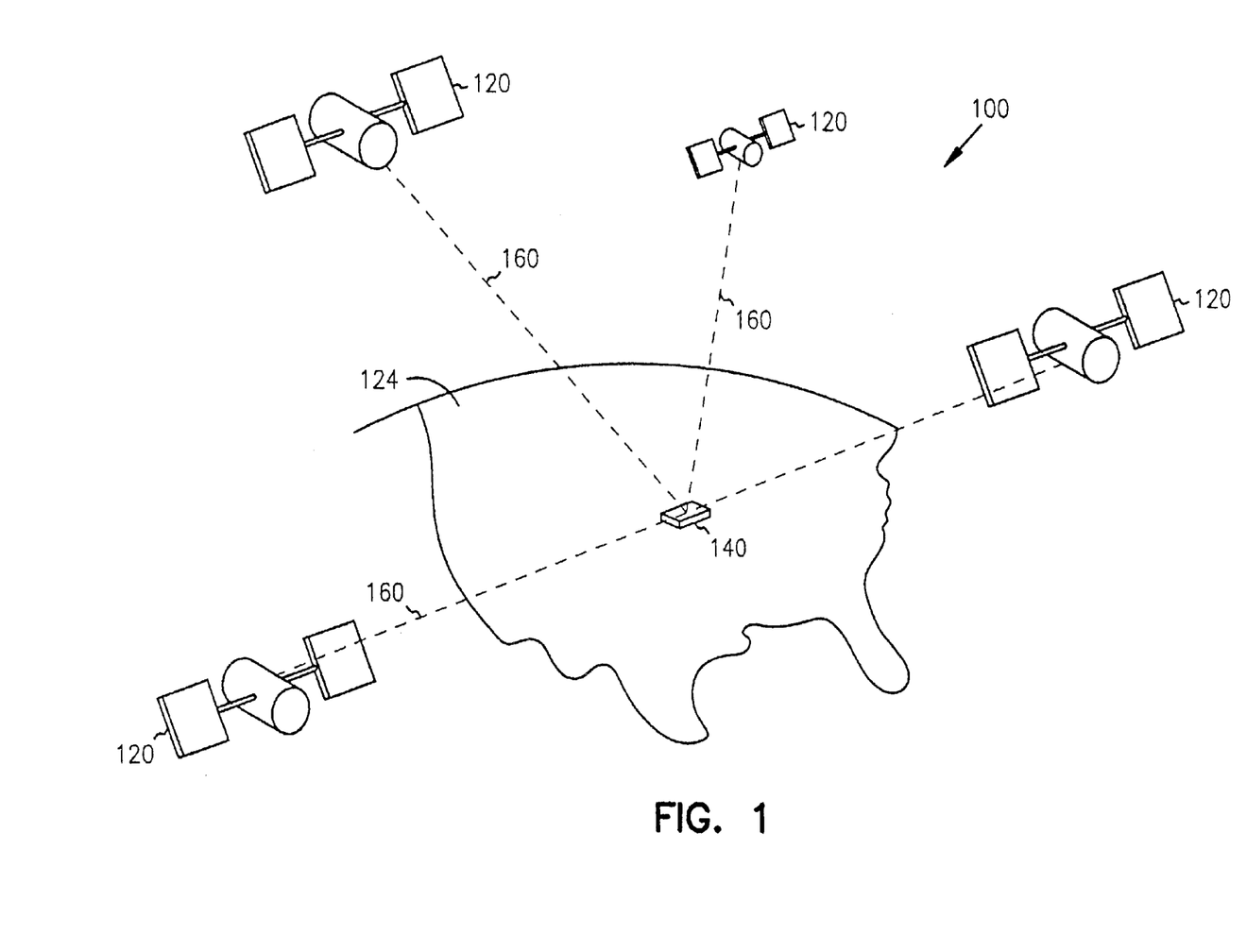
FIG. 1 is a representative view of a Global Positioning System (GPS)

FIG. 1 is representative of a GPS denoted generally by reference numeral 100. A plurality of satellites 120 are in orbit about the Earth 124. The orbit of each satellite 120 is not necessarily synchronous with the orbits of other satellites 120 and, in fact, is likely asynchronous. A GPS receiver device 140 of the present invention is shown receiving spread spectrum GPS satellite signals 160 from the various satellites 120.

The spread spectrum signals 160 continuously transmitted from each satellite 120 utilize a highly accurate frequency standard accomplished with an extremely accurate atomic clock. Each satellite 120, as part of its data signal transmission 160, transmits a data stream indicative of that particular satellite 120. It will be appreciated by those skilled in the relevant art that the GPS receiver device 140 must acquire spread spectrum GPS satellite signals 160 from at least three satellites 120 for the GPS receiver device 140 to calculate its two-dimensional position by triangulation. Acquisition of an additional signal 160, resulting in signals 160 from a total of four satellites 120, permits GPS receiver device 140 to calculate its three-dimensional position.

Figure 2A:
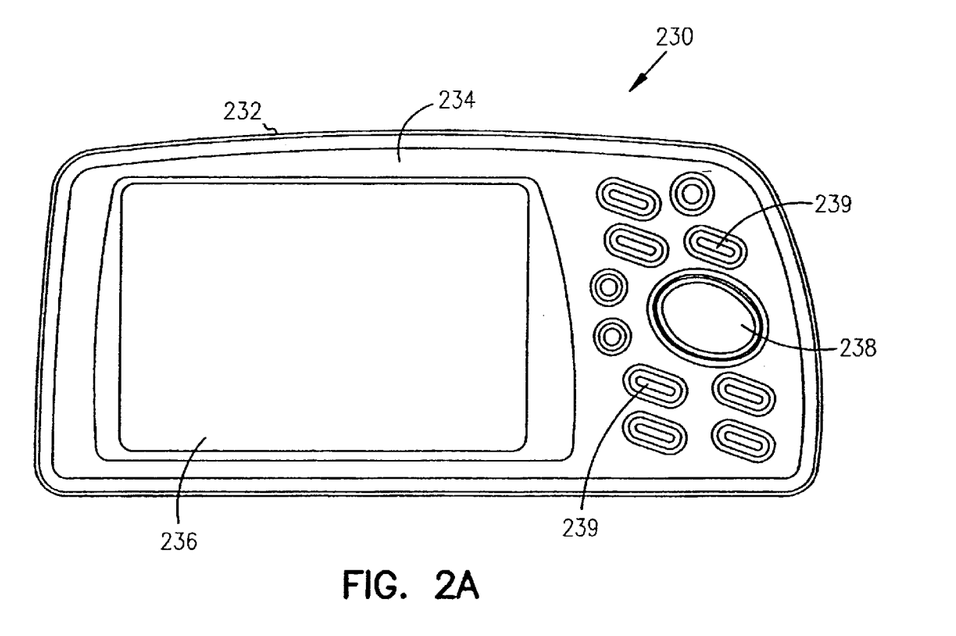
FIGS. 2A and 2B illustrate views for one embodiment of an electronic navigational device according to the teachings of the present invention.
Figure 2B:
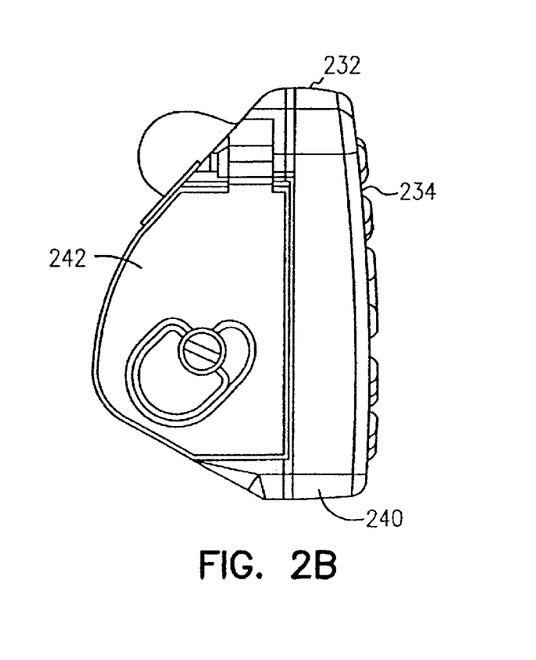

FIGS. 2A and 2B illustrate views for one embodiment of an electronic navigational device 230 according to the teachings of the present invention. As one of ordinary skill in the art will understand upon reading this disclosure, the device can be portable and can be utilized in any number of implementations such as automobile, personal marine craft, and avionic navigation. In the embodiment of FIG. 2A a front view of the navigational device 230 is provided showing the navigational device has a generally rectangular housing 232. The housing 232 is constructed of resilient material and has been rounded for aesthetic and ergonomic purposes. As shown in FIG. 2A, the control face 234 has access slots for an input key pad 238, other individual keys 239, and a display screen 236. In one embodiment, the display screen 236 is a LCD display which is capable of displaying both text and graphical information. The invention, however, is not so limited. Audio information can likewise be provided in one embodiment.

In FIG. 2B, a side view of the navigational device 230 is provided. FIG. 2B illustrates that the device's housing 232 is defined by an outer front case 240 and a rear case 242. As shown in FIG. 2B, the outer front case 240 is defined by the control face 234. In the embodiment shown in FIG. 2B, the outer front case 240 and the rear case 242 are made of one molded piece to form the device housing 232 and support input key pad 238, other individual keys 239, and display screen 236 in respective access slots shown in the control face 234 of FIG. 2A.

Figure 3A:
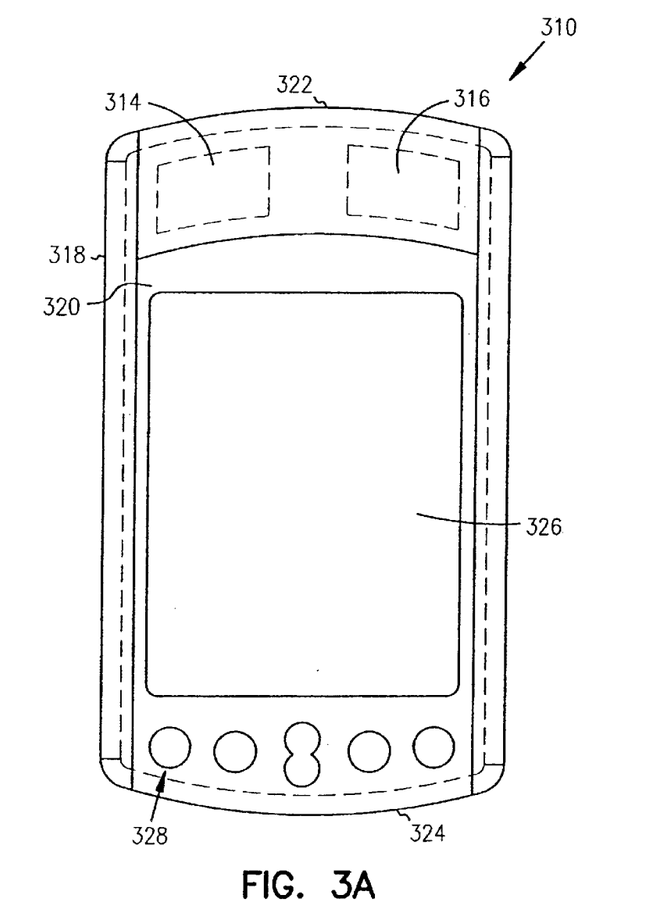
FIGS. 3A–3C illustrate views for another embodiment of an electronic navigational device according to the teachings of the present invention.
Figure 3B:
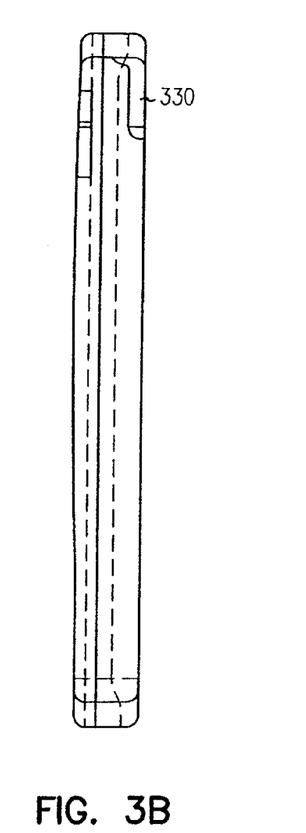
Figure 3C:
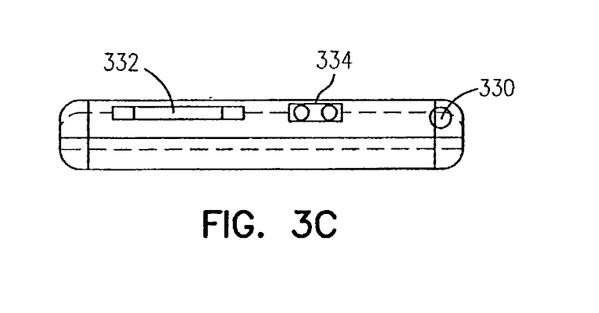

FIGS. 3A–3C illustrate views for another embodiment of an electronic navigational device 310 according to the teachings of the present invention. The navigational device 310 shown in FIGS. 3A–3C includes a personal digital assistant (PDA) with integrated GPS receiver and cellular transceiver according to the teachings of the present invention. The GPS integrated PDA operates with an operating system (OS) such as, for example, the well-known Palm or Pocket PC operating systems, or the lesser-used Linux OS. As shown in the top view of FIG. 3A, the GPS integrated PDA 310 includes an internal integrated GPS patch antenna 314 and a cellular transceiver 316 contained in a housing 318. The housing 318 is generally rectangular with a low profile and has a front face 320 extending from a top end 322 to a bottom end 324. Mounted on front face 320 is a display screen 326, which is touch sensitive and responsive to a stylus 330 (shown stored in the side view of FIG. 3B) or a finger touch. FIGS. 3A–3C illustrate the stylus 330 nested within housing 318 for storage and convenient access in a conventional manner. The embodiment shown in FIG. 3A illustrates a number of control buttons, or input keys 328 positioned toward the bottom end 324. The invention, however, is not so limited and one of ordinary skill in the art will appreciate that the input keys 328 can be positioned toward the top end 322 or at any other suitable location. The end view of FIG. 3C illustrates a map data cartridge bay slot 332 and headphone jack 334 provided at the top end 322 of the housing 318. Again, the invention is not so limited and one of ordinary skill in the art will appreciate that a map data cartridge bay slot 332 and headphone jack 334 can be provided at the bottom end 324, separately at opposite ends, or at any other suitable location.

It should be understood that the structure of GPS integrated PDA 310 is shown as illustrative of one type of integrated PDA navigation device. Other physical structures, such as a cellular telephone and a vehicle-mounted unit are contemplated within the scope of this invention.

FIGS. 2A–2B and 3A–3C are provided as illustrative examples of hardware components for a navigational device according to the teachings of the present invention. However, the invention is not limited to the configuration shown in FIGS. 2A–2B and 3A–3C. One of ordinary skill in the art will appreciate other suitable designs for a hardware device which can accommodate the present invention.

Figure 4A:
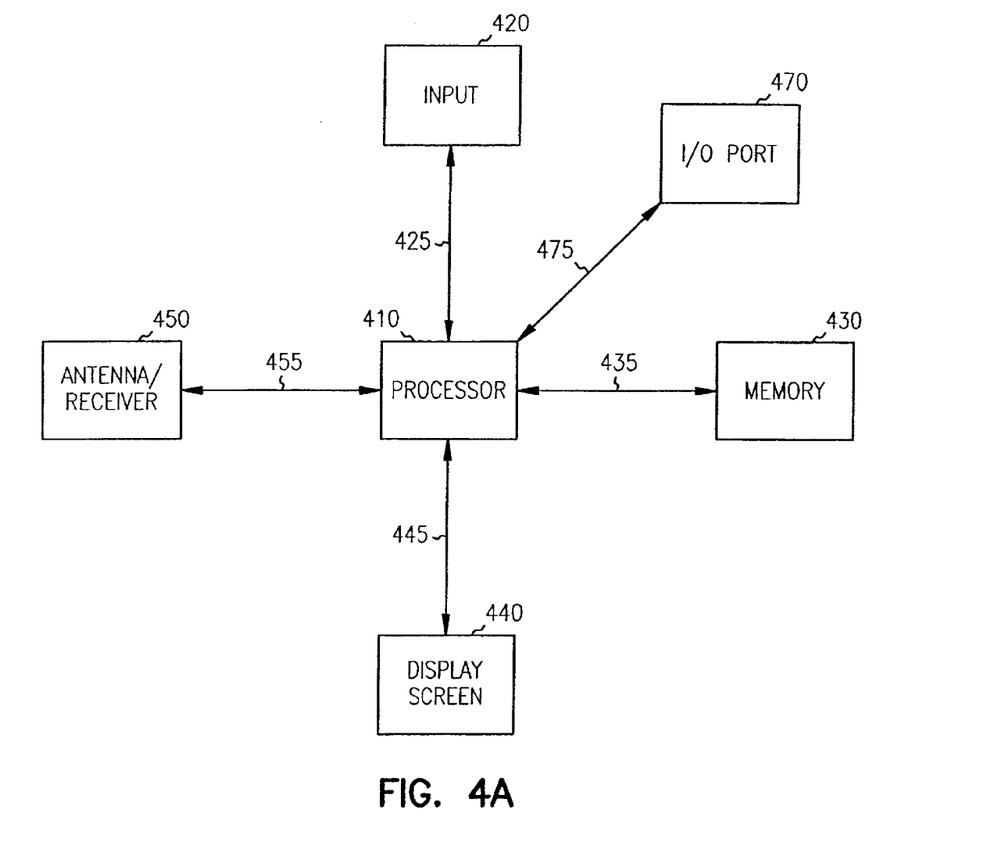
FIG. 4A is a block diagram of one embodiment for the electronic components within the hardware of FIGS. 2A–2B according to the teachings of the present invention.

FIG. 4A is a block diagram of one embodiment for the electronic components within the hardware of FIGS. 2A–2B, such as within housing 332 and utilized by the electronic navigational device. In the embodiment shown in FIG. 4A, the electronic components include a processor 410 which is connected to an input 420, such as keypad via line 425. It will be understood that input 420 may alternatively be a microphone for receiving voice commands. Processor 410 communicates with memory 430 via line 435. Processor 410 also communicates with display screen 440 via line 445. An antenna/receiver 450, such as a GPS antenna/receiver is connected to processor 410 via line 455. It will be understood that the antenna and receiver, designated by reference numeral 450, are combined schematically for illustration, but that the antenna and receiver may be separately located components, and that the antenna may be a GPS patch antenna or a helical antenna. The electronic components further include I/O ports 470 connected to processor 410 via line 475.

Figure 4B:
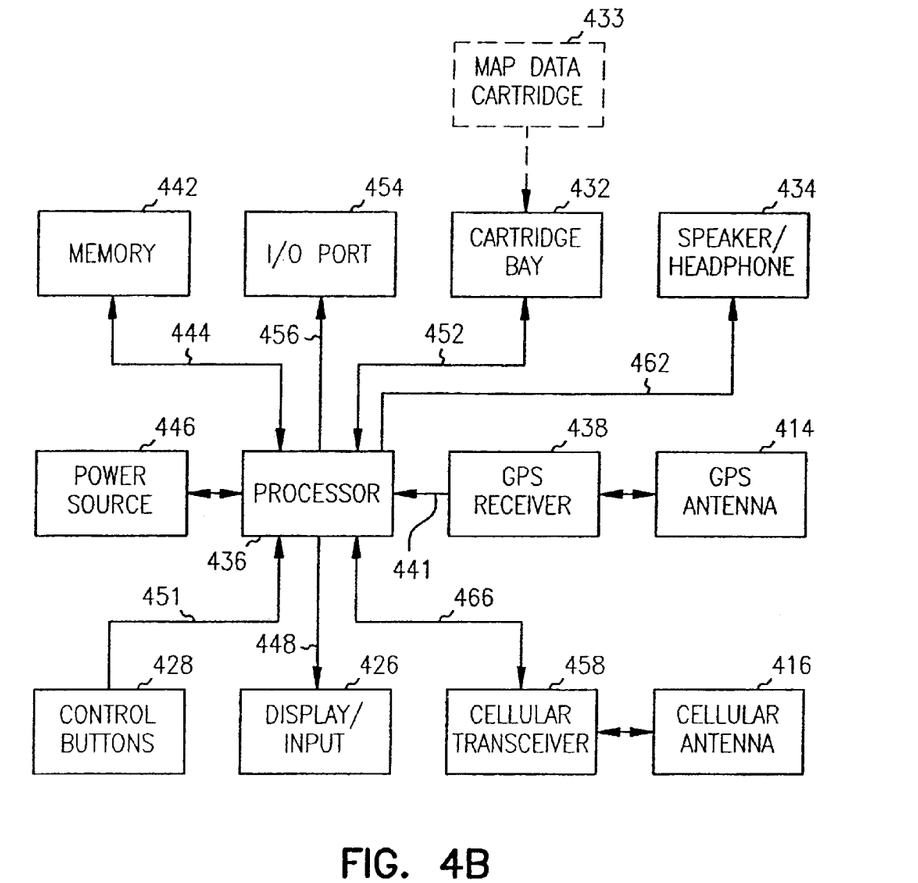
FIG. 4B is a block diagram of one embodiment for the electronic components within the hardware of FIGS. 3A–3C according to the teachings of the present invention.

FIG. 4B is a block diagram of one embodiment for the electronic components within the hardware of FIGS. 3A–3C and utilized by the GPS integrated PDA 310 according to the teachings of the present invention. The electronic components shown in FIG. 4B include a processor 436 which is connected to the GPS antenna 414 through GPS receiver 438 via line 441. The processor 436 interacts with an operating system (such as PalmOS; Pocket PC) that runs selected software depending on the intended use of the PDA 310. Processor 436 is coupled with memory 442 such as RAM via line 444, and power source 446 for powering the electronic components of PDA 310. The processor 436 communicates with touch sensitive display screen 426 via data line 448.

The electronic components further include two other input sources that are connected to the processor 436. Control buttons 428 are connected to processor 436 via line 451 and a map data cartridge 433 inserted into cartridge bay 432 is connected via line 452. A conventional serial I/O port 454 is connected to the processor 436 via line 456. Cellular antenna 416 is connected to cellular transceiver 458, which is connected to the processor 436 via line 466. Processor 436 is connected to the speaker/headphone jack 434 via line 462. The PDA 310 may also include an infrared port (not shown) coupled to the processor 436 that may be used to beam information from one PDA to another.

As will be understood by one of ordinary skill in the art, the electronic components shown in FIGS. 4A and 4B are powered by a power source in a conventional manner. As will be understood by one of ordinary skill in the art, different configurations of the components shown in FIGS. 4A and 4B are considered within the scope of the present invention. For example, in one embodiment, the components shown in FIGS. 4A and 4B are in communication with one another via wireless connections and the like. Thus, the scope of the navigation device of the present invention includes a portable electronic navigational aid device.

According to the teachings of the present invention, the electronic components embodied in FIGS. 4A and 4B are adapted to provide an electronic navigational aid device with forced layer switching capabilities for a more efficient use of RAM and other resources regardless of the amount of memory available. In particular, one of ordinary skill in the art will understand upon reading this disclosure, that the invention is necessary to achieve efficiency and the most accurate results for finding a path, or solution, between two locations in a network in device implementations having limited memory, e.g. devices having a memory size of 512 kilobytes or less. In the invention, the processor is adapted to communicate with the memory. According to the teachings of the present invention, the processor operates on a novel algorithm which makes more efficient use of RAM and can quickly obtain a best or reasonably best path between two locations. The memory contains cartographic data including any number of locations and data indicative of thoroughfares of a plurality of types connecting certain ones of the locations. In memory, the plurality of types of thoroughfares are contained in a data structure organized in a hierarchy of detail levels, or layers. The processor operates on the novel route calculation algorithm to find a path, or convergence, between any two of the number of locations. Additionally, according to the teachings of the present invention, the route calculation algorithm forces switching between different levels in the hierarchy of detail levels based on a set of criteria.

According to one embodiment of the present invention, the set of criteria includes; a number of jump segments requirement, a distance requirement, a minimum memory usage requirement, a maximum memory usage requirement, and an at least one jump segment requirement. In the invention, the set of criteria are independently variable in order to tailor an aggressiveness with which the route calculation algorithm forces switching between different levels in the hierarchy of detail levels.

In one embodiment, the hierarchy of detail levels includes a hierarchy of ever-decreasing detail levels such that a lowest level includes the greatest amount of detail. However, the invention is not so limited and one of ordinary skill in the art will understand upon reading and comprehending this disclosure that a hierarchy of ever-increasing detail levels such that the highest level includes the greatest amount of detail, or any other suitable hierarchy of detail levels, can be suited to the present invention.

In one embodiment, the presence of a type of thoroughfare in any given layer of the hierarchy of detail layers is determined by a traversability of the thoroughfare. For example, the traversability of the thoroughfare can be determined by the driveability of a road. Herein, the driveability of the road may be determined by the classification of the road, a speed classification of the road, a driving history on the road, and the like. However, the invention is not so limited and one of ordinary skill in the art will understand upon reading and comprehending this disclosure, that other criteria for determining the presence of a type of thoroughfare in any given layer of the hierarchy can be suited to the present invention.

As shown in FIGS. 4A and 4B, the device further includes a display 440 in communication with the processor 410 and the memory 430. The display 440 is adapted to display all or part of a "convergence" and/or a "solution," as the terms have been described herein, between any two of the number of locations. According to the teachings of the present invention, the device incorporates these and other functions as will be explained in more detail below in connection with FIGS. 6–9.

Figure 5:
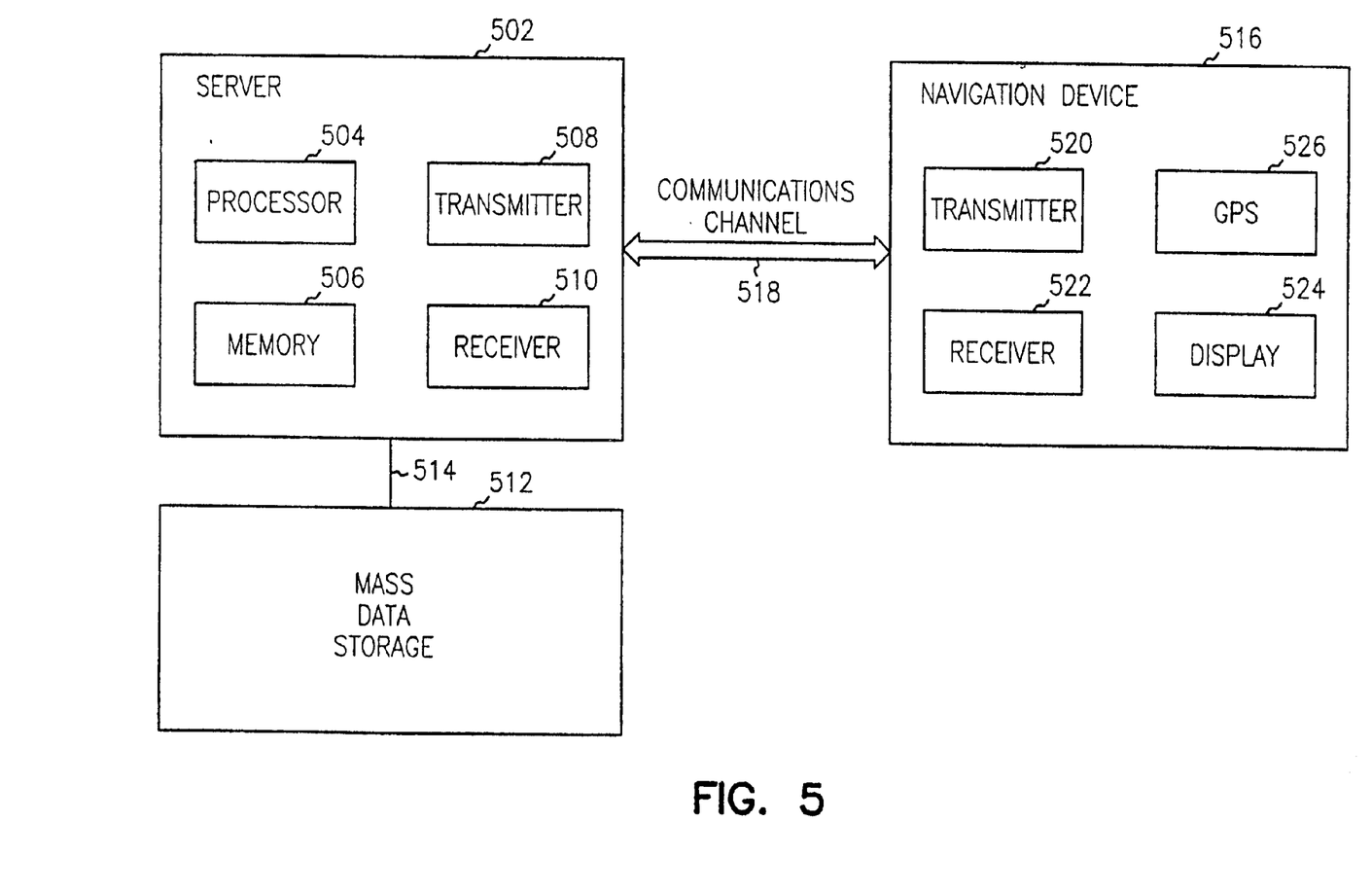
FIG. 5 is a block diagram of a navigation system according to the teachings of the present invention.

FIG. 5 is a block diagram of an embodiment of a navigation system which can be adapted to the teachings of the present invention. The navigation system includes a server 502. According to one embodiment, the server 502 includes a processor 504 operably coupled to memory 506, and further includes a transmitter 508 and a receiver 510 to send and receive data, communication, and/or other propagated signals. The transmitter 508 and receiver 510 are selected or designed according to the communication requirements and the communication technology used in the communication design for the navigation system. The functions of the transmitter 508 and the receiver 510 may be combined into a single transceiver.

The navigation system further includes a mass data storage 512 coupled to the server 502 via communication link 514. The mass data storage 512 contains a store of navigation data. One of ordinary skill in the art will understand, upon reading and comprehending this disclosure, that the mass data storage 512 can be separate device from the server 502 or can be incorporated into the server 502.

In one embodiment of the present invention, the navigation system further includes a navigation device 516 adapted to communicate with the server 502 through the communication channel 518. According to one embodiment, the navigation device 516 includes a processor and memory, as previously shown and described with respect to the block diagrams of FIGS. 4A and 4B. Furthermore, the navigation device 516 includes a transmitter 520 and receiver 522 to send and receive communication signals through the communication channel 518. The transmitter 520 and receiver 522 are selected or designed according to the communication requirements and the communication technology used in the communication design for the navigation system. The functions of the transmitter 520 and receiver 522 may be combined into a single transceiver.

Software stored in the server memory 506 provides instructions for the processor 504 and allows the server 502 to provide services to the navigation device 516. One service provided by the server 502 involves processing requests from the navigation device 516 and transmitting navigation data from the mass data storage 512 to the navigation device 516. According to one embodiment, another service provided by the server 502 includes processing the navigation data using various algorithms for a desired application, and sending the results of these calculations to the navigation device 516.

The communication channel 518 is the propagating medium or path that connects the navigation device 516 and the server 502. According to one embodiment, both the server 502 and the navigation device 516 include a transmitter for transmitting data through the communication channel and a receiver for receiving data that has been transmitted through the communication channel.

The communication channel 518 is not limited to a particular communication technology. Additionally, the communication channel 518 is not limited to a single communication technology; that is, the channel 518 may include several communication links that use a variety of technology. For example, according to various embodiments, the communication channel is adapted to provide a path for electrical, optical, and/or electromagnetic communications. As such, the communication channel includes, but is not limited to, one or a combination of the following: electrical circuits, electrical conductors such as wires and coaxial cables, fiber optic cables, converters, radio-frequency (RF) waveguides, the atmosphere, and empty space. Furthermore, according to various embodiments, the communication channel includes intermediate devices such as routers, repeaters, buffers, transmitters, and receivers, for example.

In one embodiment, for example, the communication channel 518 includes telephone and computer networks. Furthermore, in various embodiments, the communication channel 516 is capable of accommodating wireless communication such as radio frequency, microwave frequency and infrared communication, and the like. Additionally, according to various embodiments, the communication channel 516 accommodates satellite communication.

The communication signals transmitted through the communication channel 518 include such signals as may be required or desired for a given communication technology. For example, the signals may be adapted to be used in cellular communication technology, such as time division multiple access (TDMA), frequency division multiple access (FDMA), code division multiple access (CDMA), global system for mobile communications (GSM), and the like. Both digital and analog signals may be transmitted through the communication channel 518. According to various embodiments, these signals are modulated, encrypted and/or compressed signals as may be desirable for the communication technology.

The mass data storage includes sufficient memory for the desired navigation application. Examples of mass data storage include magnetic data storage media such as hard drives, optical data storage media such as CD ROMs, charge storing data storage media such as Flash memory, and molecular memory, such as now known or hereinafter developed.

According to one embodiment of the navigation system, the 502 server includes a remote server accessed by the navigation device 516 through a wireless channel. According to other embodiments of the navigation system, the server 502 includes a network server located on a local area network (LAN), wide area network (WAN), a virtual private network (VPN) and server farms.

According to another embodiment of the navigation system, the server 502 includes a personal computer such as a desktop or laptop computer. In one embodiment, the communication channel 518 is a cable connected between the personal computer and the navigation device. According to one embodiment, the communication channel 518 is a wireless connection between the personal computer and the navigation device 516.

FIG. 5 presents yet another embodiment for a collective set of electronic components adapted to the present invention. As one of ordinary skill in the art will understand upon reading and comprehending this disclosure, the navigation system of FIG. 5 is adapted to the present invention in a manner distinguishable from that described and explained in detail in connection with FIGS. 4A and 4B.

That is, the navigational system 500 of FIG. 5 is likewise adapted to provide an electronic navigational aid device 516 with forced layer switching capabilities for a more efficient use of RAM and other resources regardless of the amount of memory available. Thus, in one embodiment the server 502 includes a memory having a memory size of 2 megabytes or more. In the invention, the processor 504 is adapted to communicate with the memory 506. According to the teachings of the present invention, the processor 504 operates on a novel algorithm which makes more efficient use of the server's RAM 506 and can quickly obtain a best or reasonably best path between two locations. The server 502 processes the novel algorithm in conjunction with the cartographic data including any number of locations and data indicative of thoroughfares of a plurality of types connecting certain ones of the locations as stored in memory 506. In memory 506, the plurality of types of thoroughfares are contained in a data structure organized in a hierarchy of detail levels, or layers. The processor 504 operates on the novel route calculation algorithm to find a path, or convergence, between any two of the number of locations. Additionally, according to the teachings of the present invention, the route calculation algorithm forces switching between different levels in the hierarchy of detail levels based on a set of criteria.

As described in connection with FIGS. 4A and 4B, the set of criteria includes; a number of jump segments requirement, a distance requirement, a minimum memory usage requirement, a maximum memory usage requirement, and an at least one jump segment requirement. In the invention and as will be explained in more detail below, the set of criteria are independently variable in order to tailor an aggressiveness with which the route calculation algorithm forces switching between different levels in the hierarchy of detail levels.

The system can further operate on signals, e.g. GPS signals, originally received by the navigational device 516. Similar to the navigational device of FIGS. 4A and 4B, the navigation device 516 in system 500 is outfitted with a display 524 and GPS capabilities 526. As one of ordinary skill in the art will understand upon reading and comprehending this disclosure, a user of the navigation device 516 can be proximate to or accompanying the navigation device 516. The invention however, is not so limited. The features and functionality explained and described in detail above in connection with the device of FIGS. 4A and 4B are likewise available in the system 500 of FIG. 5.

Figure 6:
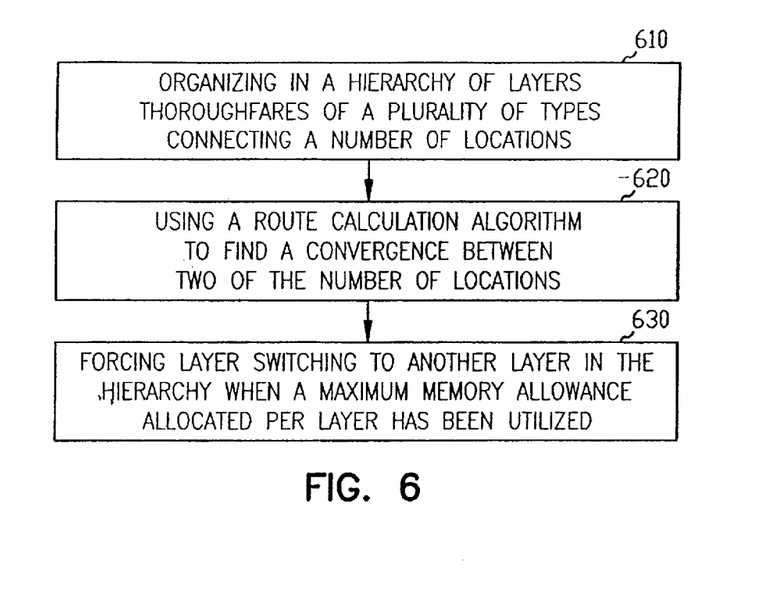
FIG. 6 is a flow diagram of one embodiment of a navigation aid method according to the teachings of the present invention.

FIG. 6 is a flow diagram of one embodiment of a navigation aid method according to the teachings of the present invention. The navigation aid method includes a method for forced layer switching within a navigation device or navigation system as described and explained in detail above in connection with FIGS. 4A, 4B and 5. And, as described above, a processor is used for processing signals which include input data from input devices, e.g.

keypads, other input keys, or other inputs, GPS signals from GPS components, and data received from I/O ports in order to perform the methods described herein. As shown in FIG. 6, the navigation aid method for performing forced layer switching includes organizing in memory data indicative of thoroughfares of a plurality of types according to a hierarchy of detail layers at block 610. The thoroughfares of the plurality of types connect a number of locations. In one embodiment, organizing in memory data indicative of thoroughfares of a plurality of types according to a hierarchy of detail layers includes organizing the thoroughfares of a plurality of types by a traversability of the thoroughfare. By way of example, and not by way of limitation, a traversablity of a thoroughfare can be determined by the thoroughfare's type, e.g. interstate road, residential road, etc., the speed classification of the thoroughfare, and other suitable factors.

A novel route calculation algorithm is used at block 620 to find a convergence between any two of the number of locations. According to the teachings of the present invention, using the route calculation algorithm includes forcing layer switching to another layer in the hierarchy of detail layers by assigning a set of criteria to the algorithm as shown in block 630. As one of ordinary skill in the art will understand upon reading this disclosure, the methods performed in block 620 and 630 can be performed simultaneously or in a different order from that shown in FIG. 6. The set of criteria includes a maximum memory usage requirement and an at least one jump segment. That is, a maximum memory allowance is allocated per layer and the algorithm forces switching to another layer in the hierarchy when the maximum memory allowance for a given layer has been utilized.

In one embodiment, organizing in memory data indicative of thoroughfares of a plurality of types according to a hierarchy of detail layers includes organizing the thoroughfares of a plurality of types by layers ever-decreasing detail such that a lowest layer includes the greatest amount of detail. One embodiment includes assigning a maximum memory usage requirement for the lowest layer equal to or less than 35% of available space on the memory.

In one embodiment of the invention, assigning a set of criteria to the algorithm further includes assigning the following set of criteria; a number of jump segments requirement, a distance requirement, and a minimum memory usage requirement. According to the teachings of the present invention, the set of criteria are independently variable at each layer in the hierarchy of detail layers. Thus, in one embodiment, the minimum memory usage requirement at a greatest layer of detail in the hierarchy of detail layers is at least 2% of available space on the memory.

As will be understood by one of ordinary skill in the art upon reading and comprehending this disclosure, the method of the invention includes a computer-accessible medium having executable instructions stored thereon capable of directing a processor to perform the inventive method.

Figure 7:
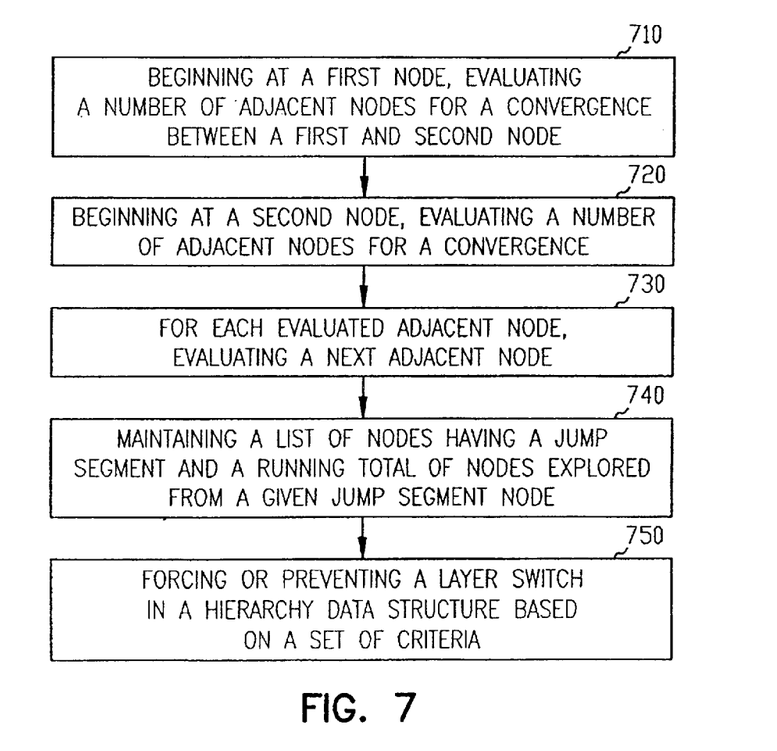
FIG. 7 is a flow diagram of another embodiment of a navigation aid method according to the teachings of the present invention.

FIG. 7 is a flow diagram of another embodiment of a navigation aid method according to the teachings of the present invention. The navigation aid method includes a method for forced layer switching for more efficient use of available RAM within a navigation device or navigation system as described and explained in detail above in connection with FIGS. 4A, 4B, and 5. And, as described above, a processor is used for processing signals which include input data from user input devices, e.g. keypads or other input keys, GPS signals from GPS device/system components, and data received from I/O ports in order to perform the methods described herein.

As shown in the embodiment of FIG. 7, the navigation aid method for forced layer switching includes beginning at a first node location and evaluating a number of adjacent nodes for a convergence between a first node location and a second node location as shown at block 710. As one of ordinary skill in the art will understand upon reading this disclosure, in one embodiment, the first node location can include a starting point location and the second node location can represent a destination or target location. However, the invention is not so limited. For example, the second node does not have be a destination location. Also, in other embodiments the method does not have to begin or end at a node. Instead, the method can include beginning at any device location and terminating at any desired device destination such as at a particular street address along a thoroughfare or even at a particular geographical feature such as a lake or golf course, or other point of interest. The method includes using a data structure indicative of thoroughfares of a plurality of types organized according to a hierarchy of detail layers with data indicative of where in the network that layer switching can be accomplished. The method further includes using a memory containing any number of cartographic locations, such as street addresses, geographical features (e.g. lakes & golf courses), points of interest and node locations which can be connected by the thoroughfares of the plurality of types.

As shown in block 720, simultaneous with evaluating a number of adjacent nodes beginning at a first node location, the method includes beginning at the second node location and evaluating a number of adjacent nodes thereto for a convergence between a first node location and a second node location. In block 730, the method proceed to evaluate a next adjacent node for each of the previously evaluated adjacent nodes. In block 740, the method continues by maintaining a list of nodes having a jump segment to a next layer in the hierarchy of detail layers and by maintaining a running total of nodes explored from a given jump segment node a next adjacent node. As used herein, the term jump segment is intended to mean any link, path, or node at which the algorithm can switch to another layer in the hierarchy of detail layers and still proceed with executing the convergence.

In block 750, the method continues by forcing or preventing a layer switch in the hierarchical data structure being operated on by the novel algorithm based on a set of criteria.

According to the teachings of the present invention, forcing a layer switch in the hierarchy of detail layers based on a set of criteria includes forcing a layer switch when at least one jump segment has been found and a maximum memory allowance has been utilized for a given layer. In the invention, the maximum memory allowance for each given layer can be independently varied in order to tailor an aggressiveness which a route algorithm forces switching between different levels, or layers in the hierarchy of detail layers. For instance, in a given layer the maximum memory allowance for the layer can be reduced in order to increase the algorithms affinity for switching, moving or jumping to another layer in the hierarchy of detail layers.

According to the teachings of the present invention, preventing a layer switch in the hierarchy of detail layers includes doing so until a requisite number of jump segments have been found in combination with a requisite number in the running total of nodes explored from a given jump segment node, a minimum distance from a node location has been explored, and a minimum memory space has been utilized for a given layer.

As one of ordinary skill in the art will understand upon reading and comprehending this disclosure, forcing a layer switch based on the above set of criteria preempts preventing a layer switch. Further, the requisite number of jump segments in combination with a requisite number in the running total of nodes explored from a given jump segment node, the minimum distance from a node location that has been explored, and the minimum memory space utilization are all independently variable for each given layer in order to increase or decrease the algorithms affinity for switching, moving or jumping to another layer in the hierarchy of detail layers.

Figure 8:
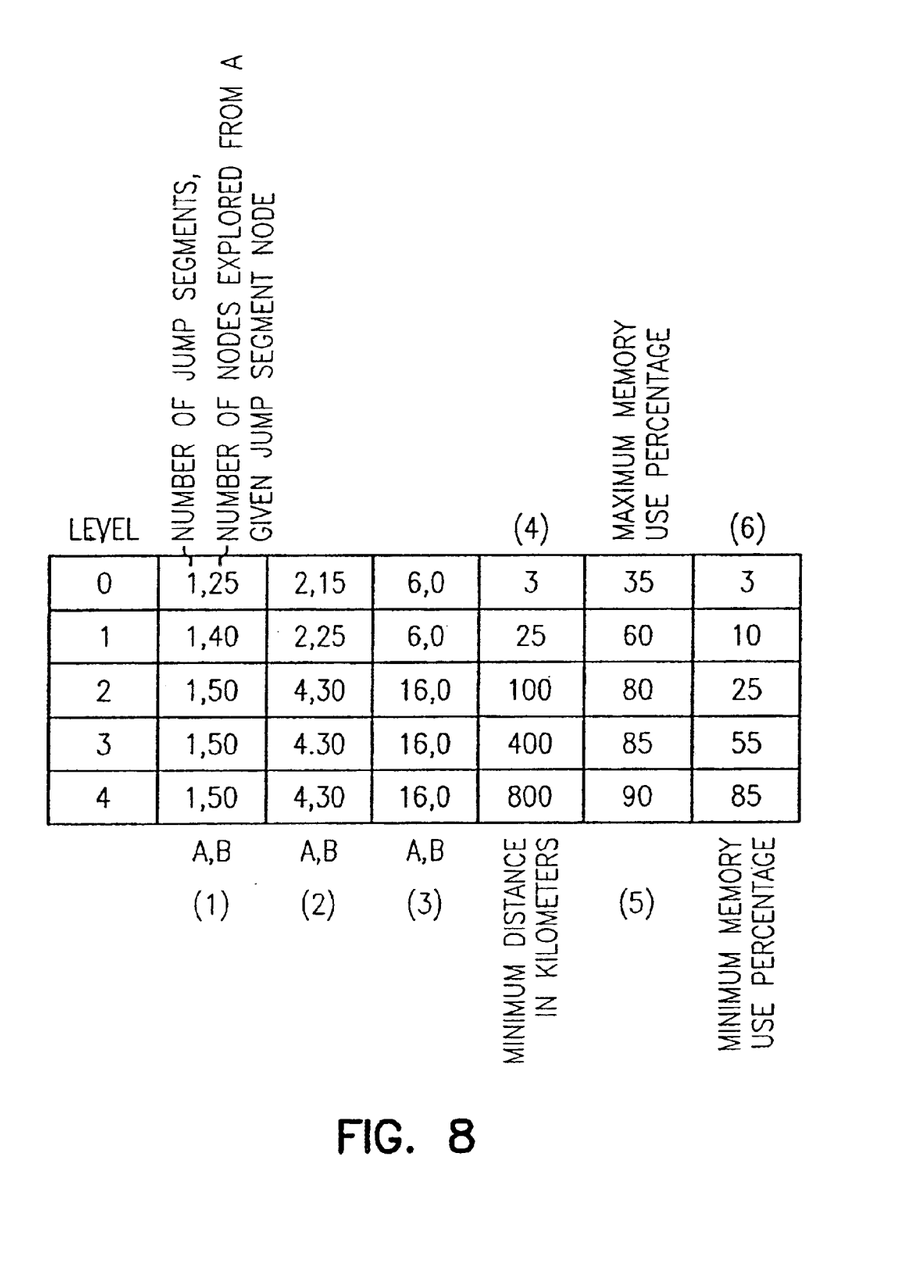
FIG. 8 provides a table which is useful for understanding one embodiment of the different set of criteria used to force or to prevent layer switching according to the teachings of the present invention.

In one embodiment, and as illustrated more in the table provided in FIG. 8, each given layer includes a number of alternatives for the requisite number of jump segments and requisite number in the running total of nodes explored from a given jump segment node combinations which can satisfy a switching threshold requirement. In one embodiment of the invention, the method further includes selecting a solution from a number of convergences between the first node location and the second node location. That is, in one embodiment, if a number of solutions have been found for a convergence between a first location and a second location, then other sets of criteria can be used to select from among the number of solutions. By way of example, and not by way of limitation, one from within a number of solutions can be chosen based on a set of criteria which includes; a shortest path or route between the two locations, a fastest travel time between the two locations, a preferred thoroughfare type or speed classification, and other suitable criteria of the like.

FIG. 8 provides a table which is useful for understanding one embodiment of the different set of criteria used to force or to prevent layer switching according to the teachings of the present invention. As one of ordinary skill in the art will appreciate upon reading and understanding this disclosure, Table 8 is but one embodiment of the per layer, dynamically configurable criteria. The invention is not so limited to the criteria expressed in Table 8.

FIG. 8 illustrates a number of rows and columns. The rows in FIG. 8 identify the different levels of detail in a data structure organized according to hierarchical levels, or layers of detail. In the embodiment shown in FIG. 8, level 0 represents the lowest layer, or level, which in this embodiment includes the greatest amount of detail. That is, for roadways, level 0 will contain all interstates, all residential roads, and essentially every thoroughfare.

The columns in FIG. 8 are identified as columns (1)–(6). Columns (1)–(3) are each broken into subsets (A,B). In each of these columns, subset A represents a minimum number of jump segments and column B represents a minimum number of nodes which must be explored from a given jump segment node to satisfy a switching threshold requirement. Thus, columns (1)–(3) illustrate that, according to the teachings of the present invention, each given layer includes a number of alternatives for the requisite number of jump segments and requisite number in the running total of nodes explored from a given jump segment node combinations which can satisfy a switching threshold requirement. And, any one of the alternatives can serve to fulfill the switching threshold requirement. Again, according to the teachings of the present invention, these are variable on a per layer basis to suit a particular design rule or device implementation. The invention is not so limited to the representation shown in FIG. 8. That is, as one of ordinary skill in the art will understand upon reading this disclosure, the values represented in FIG. 8 can be varied in order to tailor an aggressiveness with which a route algorithm forces or prevents switching between different levels, or layers in the hierarchy of detail layers. For instance, in a given layer the maximum memory allowance for the layer can be reduced or increased in order to increase or decrease the algorithms affinity for switching, moving or jumping to another layer in the hierarchy of detail layers.

Column (4) represents the minimum distance requirement for each layer, expressed in kilometers. Column (5) represents a maximum memory allowance for each given layer, expressed as a percentage of the total available memory space used at that point in the algorithm's execution. Column (6) represents a minimum memory usage requirement on a per layer basis, expressed as a percentage of the total available memory space used at that point in the algorithm's execution.

Thus, by way of example, and not by way of limitation, the following represents one set of criteria, or rules which the novel algorithm of the present invention will employ in determining whether to force or prevent a layer switch from route level 0 to route level 1. That is, for the embodiment shown in FIG. 8, the following route level switch threshold criteria must be satisfied to force or permit a switch from level 0 to level 1. In this example, two manner are described which can satisfy the switch threshold criteria.

According to the teachings of the present invention, a first manner to satisfy the switch threshold criteria includes meeting three requirements. The first requirement in this embodiment option includes a number of alternatives for the requisite number of jump segments and requisite number in the running total of nodes explored from a given jump segment node combinations. One alternative includes finding at least 1 jump segment and exploring at least 25 additional nodes after finding that jump segment. A second alternative includes finding at least 2 jump segments and exploring at least 15 additional nodes after finding the second jump segment. A third alternative includes finding at least 6 jump segments. Again, these expressed numbers, or criteria are variable in the invention, and the same is not limited to those numbers provided above.

The second requirement of the first manner to satisfy the switch threshold criteria relates to a distance travel. Thus, in this example the second requirement is that a distance of at least 3 kilometers be traveled before the layer switch. The third requirement of the first manner to satisfy the switch threshold criteria relates to the minimum percentage of memory space which must be used. Thus, in this example the third requirement is that at least 3% of the memory space be used.

The second manner to satisfy the switch threshold criteria involves on two requirements. The first being that at least one jump segment, or switch location, has been found and the second being that the maximum memory usage allowance for this level has been surpassed, e.g. in this example that 35% of memory space has been utilized.

Figure 9:
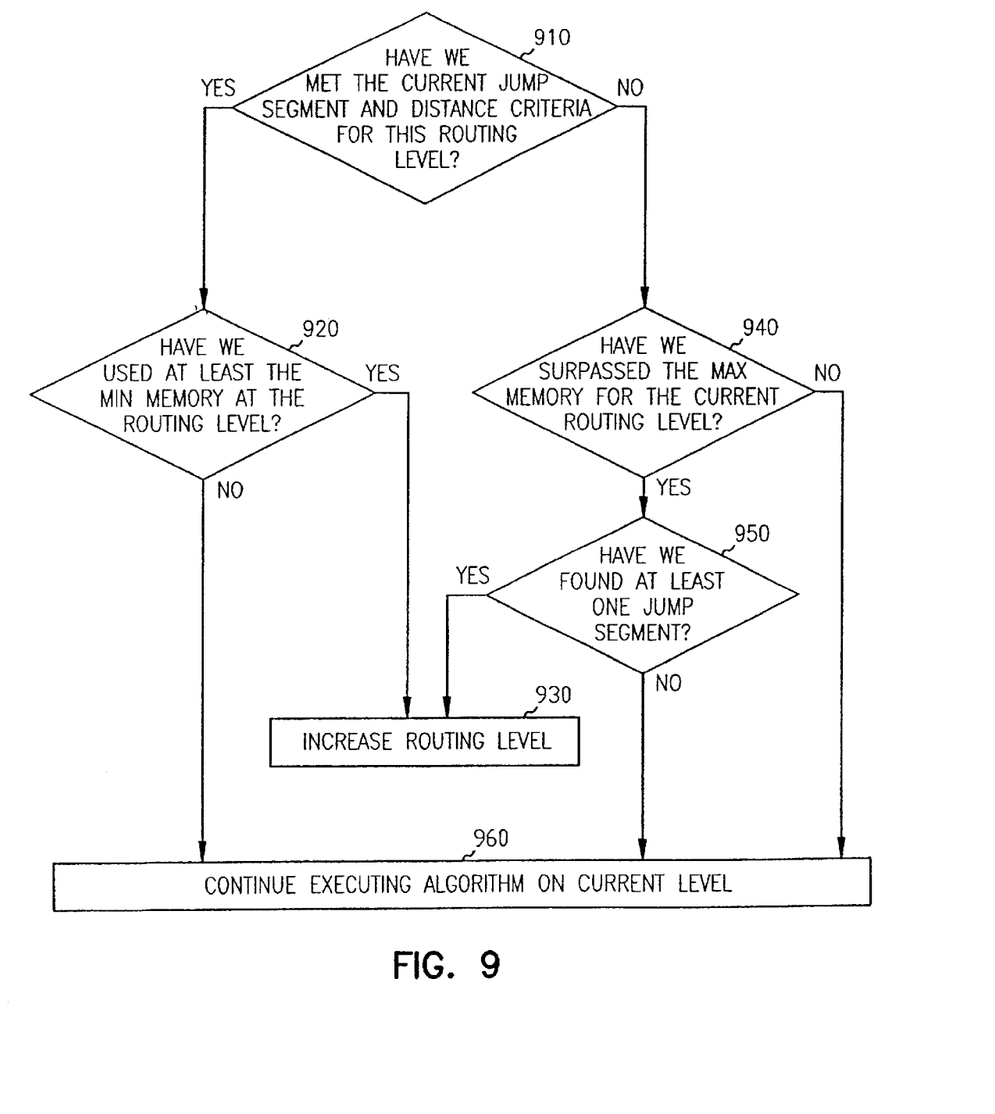
FIG. 9 illustrates yet another flow diagram embodiment for a navigation aid method according to the teachings of the present invention.

FIG. 9 illustrates yet another flow diagram embodiment for a navigation aid method according to the teachings of the present invention. As shown in FIG. 9, the method includes determining in block 910 whether a current jump and distance criteria for a given routing level has been met. If the answer is yes, or true, the method proceeds to block 920 and determines whether a minimum percentage of memory space has been used at this routing level. If the answer is yes, then the method proceeds to block 930 and the routing level is increased. Alternatively if the answer is no, or false, then the method proceeds to block 960 to continue executing the novel algorithm on the current level in search of a convergence between two points or locations.

Back in block 910, when the answer is no, the method proceeds to block 940. In block 940 the algorithm determines whether a maximum percentage of memory space, or maximum memory usage allowance for the given level has been utilized. If the answer is yes, then the method proceeds to block 950 and the algorithm determines whether at least one jump segment has been found. If the answer is yes, then the method proceeds to block 930 and the routing level is increased. Alternatively if the answer is no, or false, then the method proceeds to block 960 to continue executing the novel algorithm on the current level in search of at least one jump segment has been found. Further, if the answer in block 940 is no, then the method proceeds to block 960 to continue executing the algorithm on the current level in search of a convergence between two points or locations.

In some embodiments, the methods provided above are implemented as a computer data signal embodied in a carrier wave or propagated signal, that represents a sequence of instructions which, when executed by a processor such as processor 410 in FIG. 4A, processor 436 in FIG. 4B, or processor 504 in FIG. 5, cause the processor to perform the respective method. In other embodiments, methods provided above are implemented as a set of instructions contained on a computer-accessible medium, such as memory 430 in FIG. 4A, memory 442 in FIG. 4B or mass storage device 512 in FIG. 5, capable of directing a processor, such as processor 410 in FIG. 4A, processor 436 in FIG. 4B or processor 504 in FIG. 5, to perform the respective method. In varying embodiments, the medium is a magnetic medium, an electronic medium, or an optical medium.

As one of ordinary skill in the art will understand upon reading this disclosure, the electronic components of device shown in FIGS. 4A and 4B, and components of the system 500 shown in FIG. 5 can be embodied as computer hardware circuitry or as a computer-readable program, or a combination of both. In another embodiment, system 500 is implemented in an application service provider (ASP) system.

The system of the present invention includes software operative on a processor to perform methods according to the teachings of the present invention. One of ordinary skill in the art will understand, upon reading and comprehending this disclosure, the manner in which a software program can be launched from a computer readable medium in a computer based system to execute the functions defined in the software program. One of ordinary skill in the art will further understand the various programming languages which may be employed to create a software program designed to implement and perform the methods of the present invention. The programs can be structured in an object-orientation using an object-oriented language such as Java, Smalltalk or C++, and the programs can be structured in a procedural-orientation using a procedural language such as COBOL or C. The software components communicate in any of a number of means that are well-known to those skilled in the art, such as application program interfaces (A.P.I.) or interprocess communication techniques such as remote procedure call (R.P.C.), common object request broker architecture (CORBA), Component Object Model (COM), Distributed Component Object Model (DCOM), Distributed System Object Model (DSOM) and Remote Method Invocation (RMI). However, as will be appreciated by one of ordinary skill in the art upon reading this disclosure, the teachings of the present invention are not limited to a particular programming language or environment.

CONCLUSION

The above systems, devices and methods have been described, by way of example and not by way of limitation, with respect to improving efficiency, speed and ease of user interaction with a navigation device. That is, the systems, devices and methods provide for a navigational route planning device which is more efficient and accurate than current low cost systems, without requiring the more expensive system resources. The systems and methods of the present invention offer an improved navigational route planning device which provides a more efficient use of RAM and other resources in connection with a route calculation algorithm which quickly obtains a best or reasonable best path between two locations.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above systems, devices and methods are used. The scope of the invention should be determined with reference to the appended claims, along with the full scope of equivalents to which such claims are entitled.

What is claimed is:

1. A GPS enabled personal digital assistant (PDA), comprising:
within a housing of the PDA,
a processor;
a memory adapted to communicate with the processor, the memory having cartographic data including any number of locations and data indicative of thoroughfares of a plurality of types connecting certain ones of the locations;
wherein the plurality of types of thoroughfares are organized in a hierarchy of detail levels;
wherein the processor operates on a route calculation algorithm to determine a path to a selected one of the number of locations;
a display operably coupled to the processor, the display viewable at a front face of the housing; and
a GPS patch antenna operably coupled to the processor, and located above the display within the housing.

2. The PDA of claim 1, including a GPS receiver coupled to the processor and adapted to provide a determined position of the GPS enabled PDA, and wherein the path includes a path between the determined position and the selected one of the number of locations.

3. The PDA of claim 1, wherein the processor operates on a route calculation algorithm to find a path between any two of the number of locations, and wherein the route calculation algorithm forces switching between different levels in the hierarchy of detail levels based on a set of criteria provided to the memory.

4. The PDA of claim 3, wherein the set of criteria includes:
a number of jump segments requirement;
a distance requirement;
a minimum memory usage requirement;
a maximum memory usage requirement; and
an at least one jump segment requirement.

5. The PDA of claim 4, wherein the distance requirement includes a minimum distance requirement, the minimum distance requirement being at least 3 kilometers.

6. The PDA of claim 4, wherein the set of criteria are independently variable in order to tailor an aggressiveness with which the route calculation algorithm forces switching between different levels in the hierarchy of detail levels.

7. The PDA of claim 1, wherein the PDA includes a multifunction device capable of cellular communication.

8. A GPS enabled PDA, comprising:
within a housing of the PDA,
a processor;
a memory in communication with the processor, the memory having cartographic data including any number of locations and data indicative of thoroughfares of a plurality of types connecting certain ones of the locations;
wherein the plurality of types of thoroughfares are organized in a number of detail levels;
wherein the processor operates on a route calculation algorithm to determine a path to a selected one of the number of locations;
a display operably coupled to the processor, the display viewable at a front face of the housing;
an integrated GPS operably coupled to the processor and having an antenna located above the display within the housing; and
a cellular transceiver operably coupled to the processor and located within the housing.

9. The GPS enabled PDA of claim 8, wherein the plurality of types of thoroughfares are contained in a data structure organized in a hierarchy of detail layers.

10. The GPS enabled PDA of claim 9, wherein the processor operates on a route calculation algorithm and the hierarchy of detail layers to find a convergence between any two of the number of locations, and wherein the route calculation algorithm forces switching to another layer in the hierarchy of detail layers based on a set of criteria provided to the memory, the set of criteria including a maximum memory usage requirement and an at least one jump segment requirement.

11. The GPS enabled PDA of claim 10, wherein the maximum memory usage requirement for the lowest layer is no greater than 35% of available space on the memory.

12. The GPS enabled PDA of claim 10, wherein the set of criteria further includes:
a number of jump segments requirement;
a distance requirement; and
a minimum memory usage requirement.

13. The GPS enabled PDA of claim 12, wherein the minimum memory usage requirement at a greatest layer of detail in the hierarchy of detail layers is at least 2% of available space on the memory.

14. The GPS enabled PDA of claim 9, wherein the hierarchy of detail layers includes a hierarchy of ever-decreasing details such that a lowest layer includes the greatest amount of detail.

15. The GPS enabled PDA of claim 9, wherein the presence of a type of thoroughfare in any given layer of the hierarchy of detail layers is determined by a traversability of the thoroughfare.

16. A PDA navigation aid method, comprising:
providing a GPS enabled personal digital assistant (PDA), wherein a housing of the PDA includes;
a processor;
a memory adapted to communicate with the processor, the memory having cartographic data including any number of locations and data indicative of thoroughfares of a plurality of types connecting certain ones of the locations;
a display operably coupled to the processor, the display viewable at a front face of the housing;
integrating a GPS receiver having a GPS antenna in the housing with the processor, such that the GPS antenna is located above the display;
organizing the data indicative of the plurality of types of thoroughfares according to a hierarchy of detail layers, and
determining a path to a selected one of the number of locations with a route calculation algorithm.

17. The method of claim 16, wherein the method further includes;
organizing in the memory data indicative of thoroughfares of a plurality of types according to a hierarchy of detail layers, the thoroughfares of the plurality of types connecting a number of locations; and
using a route calculation algorithm to find a convergence between any two of the number of locations.

18. The method of claim 17, wherein organizing in memory data indicative of thoroughfares of a plurality of types according to a hierarchy of detail layers includes organizing the thoroughfares of a plurality of types by layers ever-decreasing detail such that a lowest layer includes the greatest amount of detail.

19. The method of claim 17, wherein using the route calculation algorithm includes forcing layer switching to another layer in the hierarchy of detail layers by assigning a set of criteria to the algorithm, the set of criteria including a maximum memory usage requirement and an at least one jump segment requirement.

20. The method of claim 19, wherein assigning a maximum memory usage requirement includes assigning a maximum memory usage requirement for the lowest layer equal to or less than 35% of available space on the memory.

21. The method of claim 19, wherein assigning a set of criteria to the algorithm includes assigning a set of criteria which further includes:
a number of jump segments requirement;
a distance requirement; and
a minimum memory usage requirement.

22. The method of claim 19, wherein the set of criteria are independently variable at each layer in the hierarchy of detail layers.

23. The method of claim 19, wherein assigning the minimum memory usage requirement at a greatest layer of detail in the hierarchy of detail layers is at least 2% of available space on the memory.

24. A PDA navigation aid method, comprising:
providing a GPS enabled personal digital assistant (PDA), wherein a housing of the PDA includes;
a processor;
a memory adapted to communicate with the processor, the memory having cartographic data including any number of locations and data indicative of thoroughfares of a plurality of types connecting certain ones of the locations;
a display operably coupled to the processor, the display viewable through the housing;
integrating a GPS receiver having a GPS antenna in the housing with the processor, such that the GPS antenna is located above the display;
integrating a cellular transceiver in the housing with the processor;

organizing the data indicative of the plurality of types of thoroughfares according to a hierarchy of detail layers; and calculating a path between any two of the number of locations.

25. The method of claim 24, wherein the method further includes;

providing a data structure to the memory, the data structure indicative of thoroughfares of a plurality of types organized according to a hierarchy of detail layers and having node locations connecting the thoroughfares of the plurality of types;

beginning at a first node location, evaluating a number of adjacent nodes for a convergence between a first node location and a second node location;

for each evaluated adjacent nodes, evaluating a next adjacent node;

maintaining a list of nodes having a jump segment to a next layer in the hierarchy of detail layers and maintaining a running total of nodes explored from a given jump segment node; and forcing a layer switch in the hierarchy of detail layers based on a set of criteria.

26. The method of claim 25, wherein forcing a layer switch in the hierarchy of detail layers based on a set of criteria includes forcing a layer switch when at least one jump segment has been found and a maximum memory allowance has been utilized for a given layer, the maximum memory allowance for each given layer being independently variable.

27. The method of claim 26, wherein the method further includes preventing a layer switch in the hierarchy of detail layers until a requisite number of jump segments have been found in combination with a requisite number in the running total of nodes explored from a given jump segment node, a minimum distance from the first node location has been explored, and a minimum memory space has been utilized for a given layer.

28. The method of claim 27, wherein, in the method, forcing a layer switch preempts preventing a layer switch.

29. The method of claim 27, wherein the requisite number of jump segments in combination with a requisite number in the running total of nodes explored from a given jump segment node, the minimum distance from the first node location that has been explored, and the minimum memory space utilization are all independently variable for each given layer.

30. The method of claim 29, wherein each given layer includes a number of alternatives for the requisite number of jump segments and requisite number in the running total of nodes explored from a given jump segment node combinations.

31. The method of claim 24, wherein the method further includes, simultaneous with evaluating a number of adjacent nodes beginning at a first node location, beginning at a second node location and evaluating a number of adjacent nodes thereto for a convergence between a first node location and the second node location.

32. The method of claim 31, wherein the method further includes selecting a solution from a number of convergences between the first node location and the second node location.

33. The method of claim 24, wherein the method further includes a server, operably coupled to the PDA via the cellular transceiver, to respond to a request from the PDA by performing calculations on the cartographic data and transmitting results to the PDA.

34. A method of manufacturing a combined GPS/PDA, comprising:

providing a portable, handheld housing;

locating within the housing a processor, a memory, and a display viewable at a front face of the housing, the memory and the processor operable to execute a GPS functionality and a PDA functionality, the memory operable to communicate with the processor, the memory having cartographic data including any number of locations and data indicative of thoroughfares of a plurality of types connecting certain ones of the locations;

locating within the housing a GPS receiver having a GPS antenna, such that the GPS antenna is located above the display;

organizing the data indicative of the plurality of types of thoroughfares according to a hierarchy of detail layers; and calculating a path between any two of the number of locations by using a route calculation algorithm.

35. The method of claim 34, wherein the method further includes locating a wireless communication component within the housing.

36. The method of claim 34, wherein the method further includes locating an input that is accessible at a front face of the housing at a location below the display.

* * * * *